United States Patent
Choi et al.

(10) Patent No.: US 7,166,381 B2
(45) Date of Patent: Jan. 23, 2007

(54) AIR BREATHING DIRECT METHANOL FUEL CELL PACK

(75) Inventors: Kyoung Hwan Choi, Kyungki-do (KR); Hyuk Chang, Kyungki-do (KR)

(73) Assignee: Samsung SDI Co., Ltd., Suwon (KR)

( * ) Notice: Subject to any disclaimer, the term of this patent is extended or adjusted under 35 U.S.C. 154(b) by 406 days.

(21) Appl. No.: 10/259,629

(22) Filed: Sep. 30, 2002

(65) Prior Publication Data

US 2003/0198853 A1 Oct. 23, 2003

(30) Foreign Application Priority Data

Apr. 23, 2002 (KR) ............................... 2002-22216

(51) Int. Cl.
H01M 8/04 (2006.01)
H01M 8/10 (2006.01)

(52) U.S. Cl. ........................... 429/32; 429/38; 429/39; 429/44

(58) Field of Classification Search .................. 429/13, 429/17, 39, 33
See application file for complete search history.

(56) References Cited

U.S. PATENT DOCUMENTS

| | | | |
|---|---|---|---|
| 4,537,840 A | | 8/1985 | Tsukui et al. |
| 5,364,711 A | * | 11/1994 | Yamada et al. ............... 429/15 |
| 5,861,221 A | | 1/1999 | Ledjeff et al. |
| 5,925,477 A | * | 7/1999 | Ledjeff et al. ................ 429/32 |
| 6,054,228 A | * | 4/2000 | Cisar et al. ................... 429/18 |
| 6,689,502 B1 | * | 2/2004 | Choi ........................... 429/32 |
| 2001/0051293 A1 | | 12/2001 | Narayanan et al. |
| 2002/0150804 A1 | * | 10/2002 | Srinivasan et al. ........... 429/32 |

FOREIGN PATENT DOCUMENTS

EP 1 134 830 A2 9/2001

(Continued)

OTHER PUBLICATIONS

Copy of Japanese Office Action issued on Sep. 6, 2005.

Primary Examiner—John S. Maples
(74) Attorney, Agent, or Firm—Buchanan Ingersoll & Rooney PC

(57) ABSTRACT

Provided is an air breathing direct methanol fuel cell pack including membrane electrode assemblies (MEAs) forming a plurality of single cells having an electrolyte membrane, a plurality of anodes on a first plane of the electrolyte membrane and a plurality of cathodes on a second plane of the electrolyte membrane correspondingly to the anodes, the second plane being opposed to the first plane, a fuel supply unit storing fuel fed to the anodes and having fuel supply plates with a plurality of fuel supply holes through which the fuel passes, and wicking sheets provided along a fuel supply path between the fuel supply plates and the MEAs, diffusing the fuel supplied through the fuel supply plates to supply the fuel to the anodes of the MEAs. fuel can be evenly supplied throughout MEAs, thereby attaining uniform power output, irrespective of a use posture of a cell pack. Also, current collectors of the present invention are of a mesh type so that current collection from all electrodes is allowed while allowing fuel supply. Further, since a gas communicating path for passage of byproducts is provided around the fuel supply unit and gas exhaust holes are provided on a wall body contacting the gas communicating path, byproducts can be effectively exhausted.

22 Claims, 8 Drawing Sheets

FOREIGN PATENT DOCUMENTS

| | | |
|---|---|---|
| EP | 1 241 725 A2 | 9/2002 |
| JP | 2000-106201 | 4/2000 |
| JP | 2000-268836 | 9/2000 |
| JP | 2000268836 A * | 9/2000 |
| JP | P2000-268835 A | 9/2000 |
| JP | 2001-93551 | 4/2001 |
| JP | 2001-283892 | 10/2001 |
| WO | 01/97314 A1 | 12/2001 |
| WO | WO 01/97314 A1 * | 12/2001 |

* cited by examiner

AIR BREATHING DIRECT METHANOL FUEL CELL PACK

Priority is claimed to patent application Number 2002-22216 filed in Republic of Korea on Apr. 23, 2002, herein incorporated by reference.

BACKGROUND OF THE INVENTION

1. Field of the Invention

The present invention relates to a cell pack of a direct methanol fuel cell for use as power of portable electronic devices, and more particularly, to an air breathing direct methanol fuel cell pack with an effective air supply unit and a reaction byproduct exhaust unit.

2. Description of the Related Art

A direct methanol fuel cell (DMFC), which generates electrical power by electrochemical reactions between methanol as fuel and oxygen as an oxidizing agent, has a high energy density and a high power density. Also, since the DMFC uses methanol directly as fuel, external peripheral devices such as a fuel reformer are not required and the fuel is easily stored and supplied. Further, a monopolar DMFC can be operated at room temperature and atmospheric pressure and can be made lightweight and miniaturized, thus having very wide applications including mobile communications equipment such as mobile cellular phones, PDAs or laptop computers, medical appliances, military equipment and so on.

As described above, DMFCs produce electricity by electrochemical reaction between methanol and oxygen. A single cell of such DMFCs is constructed such that an electrolyte membrane is interposed between an anode and a cathode.

Both of the anode and cathode include a fuel diffusion layer for supply and diffusion of fuel, a catalyst layer at which electrode reactions, that is, oxidation/reduction of fuel, occur, and electrode backings. As the catalyst layer for oxidation/reduction, precious metals having good characteristics even at low temperatures, such as platinum (Pt), are used, and alloys of transition metal such as ruthenium (Ru), rhodium (Rh), osmium (Os) or nickel (Ni) can also be used for preventing catalytic poisoning due to reaction byproducts, e.g., carbon monoxide. Carbon paper or carbon cloth is used as the electrode backings, and the electrode backings are waterproof for easy supply of fuel and easy exhaustion of reaction products. The polymer electrolyte membrane has a thickness of 50 to 200 μm. A proton exchange membrane having ionic conductivity is usually used as the electrolyte membrane.

The following reaction equations occur in the anode where fuel is oxidized and the cathode where oxygen is reduced, respectively.

[Anode Reaction]

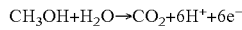

$$CH_3OH + H_2O \rightarrow CO_2 + 6H^+ + 6e^-$$

[Cathode Reaction]

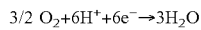

$$3/2\ O_2 + 6H^+ + 6e^- \rightarrow 3H_2O$$

[Overall Reaction]

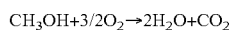

$$CH_3OH + 3/2 O_2 \rightarrow 2H_2O + CO_2$$

In the anode, carbon dioxide, six protons and six electrons are generated by reaction between methanol and water, that is, oxidation, and the generated protons are transferred to the cathode via the proton exchange membrane. In the cathode, protons and electrons supplied from an external circuit react with oxygen to produce water, that is, reduction. Thus, the overall reaction corresponds to reaction between methanol and oxygen to produce water and carbon dioxide.

A theoretical voltage generated in a DMFC single cell is approximately 1.2 V. However, the open circuit voltage under room temperature and atmospheric pressure conditions is 1 V or less and an actual operation voltage is approximately 0.3 to 0.5 V because there is a voltage drop due to activation over-potential and resistance over-potential. Thus, in order to generate a desirably high voltage, several single cells are stacked and electrically connected in series. The method stacking single cells in series is largely classified as a bipolar stack type and a monopolar cell pack type. The bipolar stack type is configured such that a single separator has both a positive (+) polarity and a negative (−) polarity and is suitably used for high power capacity. The monopolar cell pack type is configured such that a single separator has only a positive (+) or a negative (−) polarity and is suitably used for low power capacity.

According to the monopolar cell pack type, a plurality of single cells are arranged on an electrolyte membrane and then the respective single cells are connected in series, thereby considerably reducing the thickness and volume of fuel cell stack, realizing a lightweight, small-sized DMFC. In the monopolar cell pack type, the electrodes on the electrolyte membrane have all the same polarity, allowing fuel to be simultaneously supplied to all electrodes, thereby advantageously maintaining fuel concentrations of all the electrodes at a constant level.

However, in the monopolar cell pack, unlike the bipolar stack in which fuel supply and electrical connection are simultaneously established due to many graphite blocks each serving as a current collector and having a fuel flow field as a fuel supply path, it is difficult to simultaneously establish fuel supply and electrical connection. For this reason, when the contact between the current collector and anode or cathode is bad and a contact area is not wide, a current loss is generated due to contact resistance. Also, since efficient exhaustion of carbon dioxide as reaction byproducts is difficult to achieve, carbon dioxide bubbles permeate into a liquid fuel layer, thereby impeding fuel supply, and the bubbles produced on the electrode surface prevents fuel from moving to the catalyst layer, thereby noticeably deteriorating performance of electrodes.

To solve such drawbacks, a current collector plate enabling simultaneous fuel supply and current collection is necessary and such a current collector plate should be configured to maximize a contact area between the current collector plate and an electrode, thereby preventing a current loss due to contact resistance. Also, it is necessary to cause rapid exhaustion of carbon dioxide existing within the electrode by installing an appropriate exhaust path of carbon dioxide, thereby allowing fuel to be smoothly supplied to the catalyst layer.

Since a DMFC uses oxygen as a reactant gas, a DMFC cell pack should be configured such that its cathode for reduction directly contacts external air. However, when a DMFC cell pack is mounted on an electronic device to be used as a power source of the electronic device, an air inlet port formed on the external surface of the cell pack may be partially shielded at a connected area between the cell pack and the electronic device or the air inlet port may be shielded by user's body or according to use surroundings of the electronic device. In this case, since oxygen is not properly supplied to the shielded portion, electrode reactions do not occur thereat.

Another problem with the DMFC cell pack is that fuel cannot be evenly supplied to all electrodes. That is to say, since the fuel fed to the cell pack is in a liquid form, the fuel is gathered at one side of a fuel container by gravity when an electronic device equipped with a DMFC cell pack is used in a leaned state. Thus, the fuel is supplied only to electrodes located at the fuel gathered side but is not supplied to electrodes far from the fuel gathered side. Eventually, the required power output cannot be attained.

To overcome the problems, it is necessary to provide a cell pack having a structure capable of fully inducing external air thereinto to be evenly supplied to electrode surfaces, irrespective of a connected area between the cell pack and the electronic device or use surroundings of the electronic device. Also, separate means for preventing infiltration of external foreign matter or moisture must be provided. Further, there is a need for a fuel supply unit for evenly supplying fuel to all electrodes at any time irrespective of a use place or posture of the electronic device.

SUMMARY OF THE INVENTION

It is a first object of the present invention to provide a direct methanol fuel cell (DMFC) capable of supplying fuel into all anodes in a cell pack and effectively exhausting byproducts.

It is a second object of the present invention to provide a direct methanol fuel cell pack which can effectively suppress induction of external foreign matter, and allows air supply and current collection from all cathodes.

These and other objects of this invention are addressed by an air breathing direct methanol fuel cell pack including membrane electrode assemblies (MEAs) forming a plurality of single cells having an electrolyte membrane, a plurality of anodes on a first plane of the electrolyte membrane and a plurality of cathodes on a second plane of the electrolyte membrane correspondingly to the anodes, the second plane being opposed to the first plane, a fuel supply unit storing fuel fed to the anodes and having fuel supply plates with a plurality of fuel supply holes through which the fuel passes, and wicking sheets provided along a fuel supply path between the fuel supply plates and the MEAs, diffusing the fuel supplied through the fuel supply plates to supply the fuel to the anodes of the MEAs.

In one embodiment of the present invention, the air breathing direct methanol fuel cell pack may further include a wicking member for diffusing fuel into the fuel supply unit by a capillary phenomenon. Thus, the fuel can be prevented from being collected at one side of the fuel supply unit to then be evenly distributed throughout the fuel supply unit.

In another aspect of the present invention, the MEAs are provided at both sides of the fuel supply unit, the fuel supply plates are provided at both sides of the fuel supply unit facing the respective MEAs, and the wicking sheets are interposed between each of the MEAs and the fuel supply plates.

According to still another aspect of the present invention, the fuel supply unit, the MEAs and the wicking sheets disposed therebetween are provided between upper and lower panel members, and a wall body is formed between the upper and lower panel members along the perimeter, thus forming a housing in cooperation with the upper and lower panel members.

A plurality of air vent holes for supplying air to the cathode, are formed on either the upper or lower plate member facing the cathode of the MEA.

A wall body of the housing is spaced a predetermined determined apart from the fuel supply unit to form channels for passage of reaction byproducts between the lateral surface of the fuel supply unit 12 and the internal surface of the wall body, and gas exhaust holes for exhaustion of the byproducts flowing through the channels. A plurality of spaces are formed on the internal surface of the wall body to allow the wall body and the fuel supply unit to be securely spaced apart from each other.

Mesh-type current collectors are provided in the anodes and cathodes of the respective unit cells and are electrically connected to conductors constituting electrical circuits among the unit cells.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

The details of one or more embodiments of the invention are set forth in the accompanying drawings and the description below.

Figure 1:
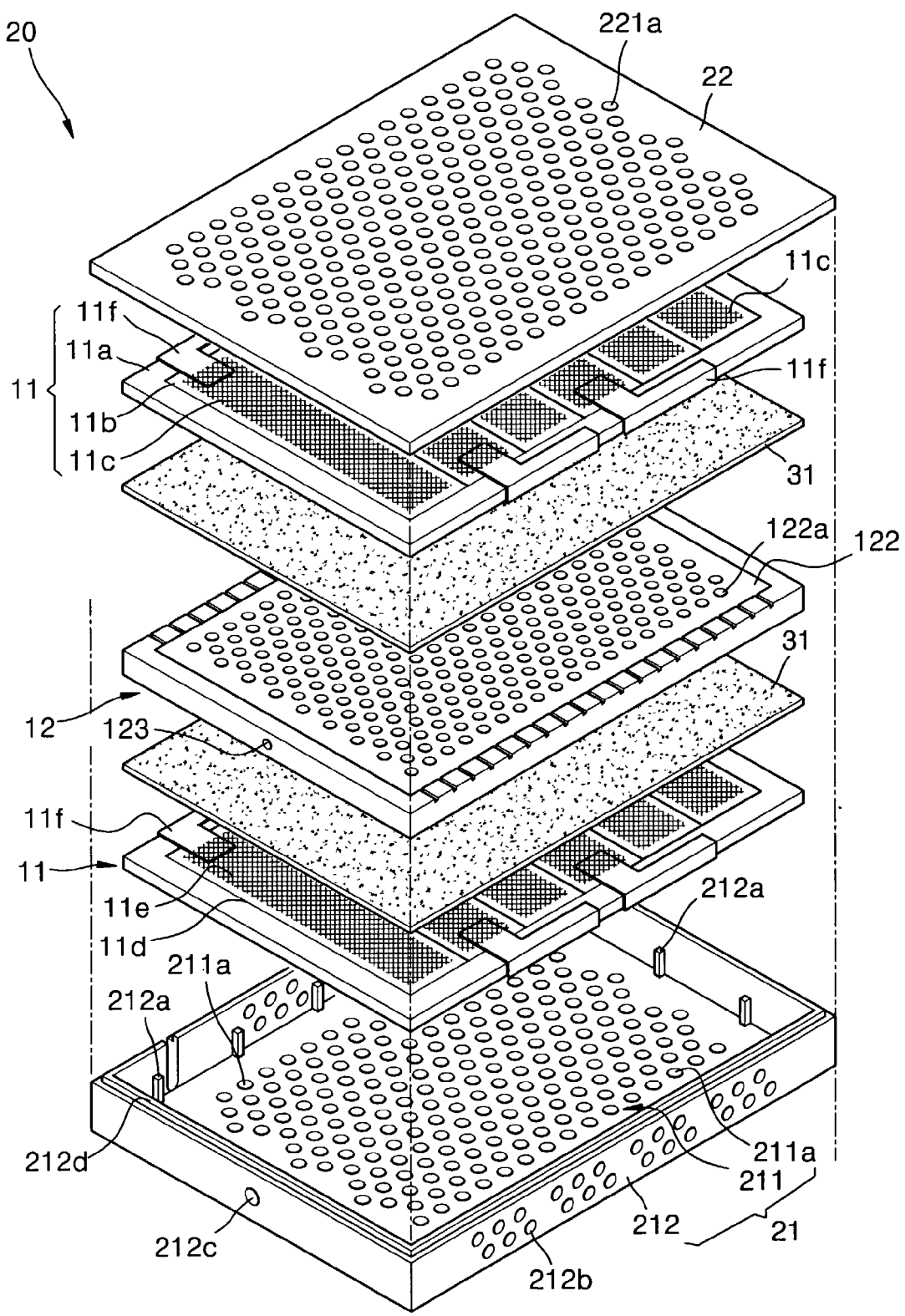
FIG. 1 is a schematic development diagram illustrating components an air breathing direct methanol fuel cell pack according to an embodiment of the present invention.
Figure 2:
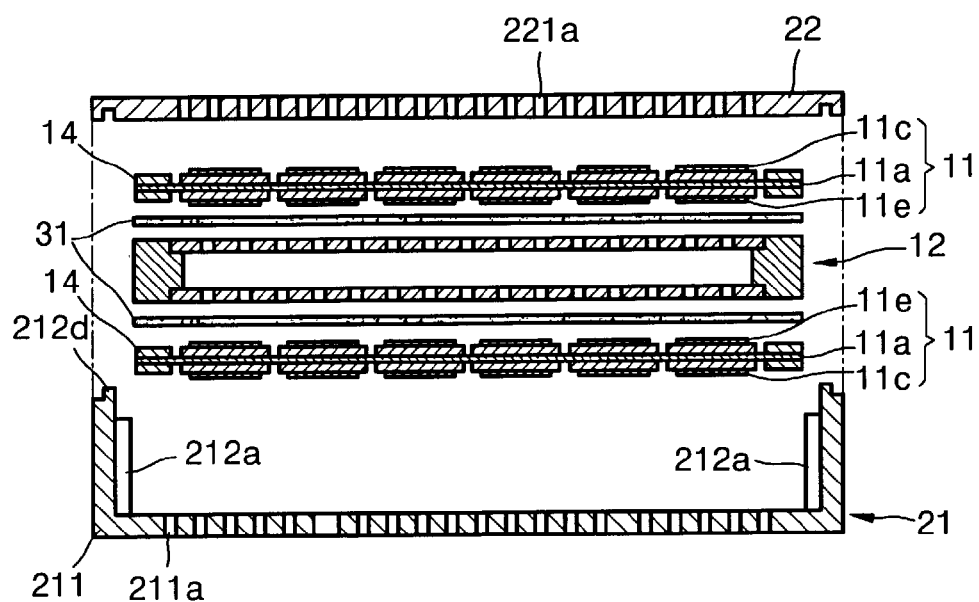
FIG. 2 is a cross-sectional development diagram illustrating the stack structure of the air breathing direct methanol fuel cell pack shown in FIG. 1.

Referring to FIGS. 1 and 2, a pair of membrane electrode assemblies (MEAs) 11 for producing electricity by methanol and air supply are symmetrically disposed in the upper and lower portions of a hexahedral fuel supply unit 12 having a fuel inlet port 123 at one side thereof, and wicking sheets 31 for effective distribution of a fuel are provided therebetween.

The MEAs 11 and the fuel supply unit 12 disposed at the center thereof are accommodated inside a hexahedral housing 20. The fuel supply unit 12 and the wicking sheets 31 provided between the upper and lower MEAs 11 feature the present invention.

The fuel supply unit 12 stores fuel inside thereof, and includes fuel supply plates with a plurality of fuel supply holes at its upper and lower portions, which will later be described in detail.

The housing 20 includes a lower body 21 having a lower panel member 211 having a plurality of air vent holes 211a and a wall body 212 formed along the perimeter of the lower panel member 211 to a predetermined height, and an upper panel member 22 being in contact with the top end of the wall body 212 to cover the lower body 21 and having a plurality of air vent holes 221a, thus forming the housing 20.

Spacers 212a and gas exhaust holes 212b for providing an exhaust path of carbon dioxide gas generated at an anode 11 facing the fuel supply unit 12 are formed on the internal surface of the wall body 212 with a gap provided between the lateral surface of the fuel supply unit 12 and the internal surface of the wall body 212. A projection 212d corresponding to a fitting groove (not shown) formed on the bottom surface of the upper panel member 22 is provided on the top end of the wall body 212, thereby promoting a secured connection between the upper panel member 22 and the lower body 21. A throughhole 212c corresponding to the fuel inlet port 123 of the fuel supply unit 12.

Each of the MEAs 11 provided at the upper and lower portions of the fuel supply unit 12 includes an electrolyte layer 11a, and a plurality of anodes 11d and a plurality of cathodes 11b, provided on first and second planes of the electrolyte layer 11a, respectively. Mesh-type current collectors 11c and 11e contact surfaces of the respective anodes 11d and cathodes 11b. A plurality of conductors 11f electrically connecting the current collector of a cathode with the current collector of an anode, of a single cell, are provided at edges of the electrolyte layers 11a.

Basic structures of a cell pack will now be described.

Figure 3:
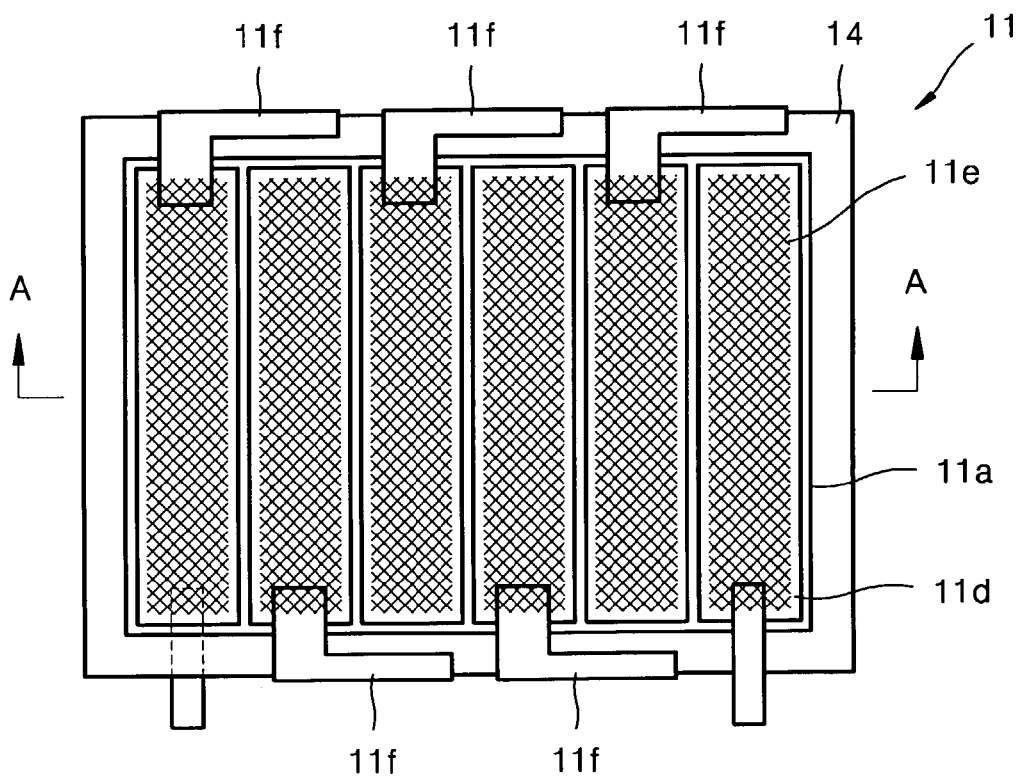
FIG. 3 is a plan view illustrating a membrane electrode assembly (MEA) employed in the air breathing direct methanol fuel cell pack according to the present invention.
Figure 4:
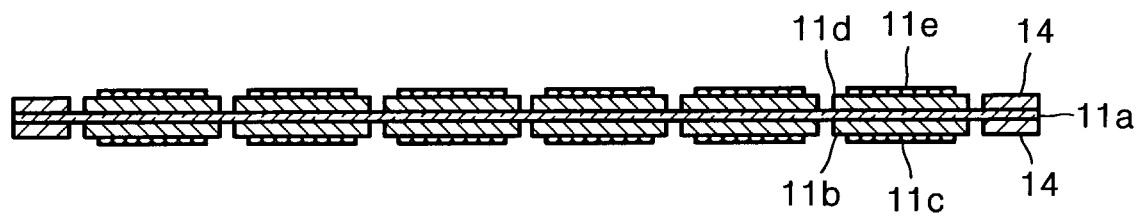
FIG. 4 is a cross-sectional view of the structure shown in FIG. 3, taken along the line A—A.

FIG. 3 is a plan view of the anode 11d of each of the MEAs 11 shown in FIGS. 1 and 2, and FIG. 4 is a cross-sectional view of FIG. 3, taken along the line A—A, in which the mesh-type current collector 11e is exploded and shown.

As shown in FIGS. 3 and 4, a rectangular flange gasket 14 is provided at each of front and back surfaces of the edges of the electrolyte layer 11a. The gasket 14 is made of Teflon coated with silicon having good elasticity and adhesiveness. The gasket 14 is not shown in FIG. 1, for brevity's sake. For the purpose of preventing leakage of methanol supplied from the fuel supply unit 12 to the anode 11d, the gasket 14 is formed at the edges of the upper and lower surfaces of each of the MEAs 11, thereby exhibiting a sealing effect when all parts of the cell pack are assembled.

Figure 5:
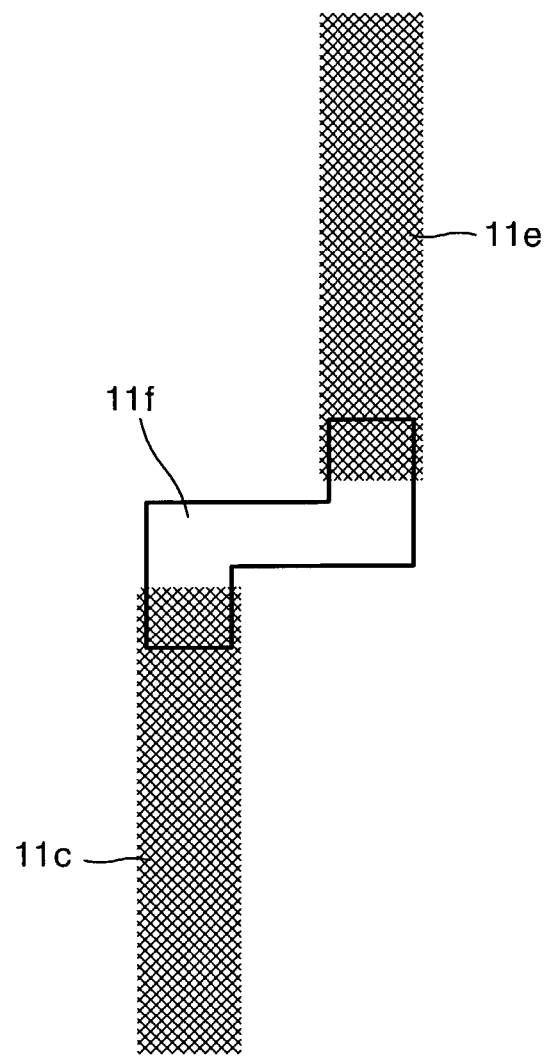
FIG. 5 is a plan view illustrating a current collector employed in the air breathing direct methanol fuel cell pack according to the present invention, and a conductor connecting the current collector to the cell pack.

Six sets of anode and cathodes 11d and 11b are symmetrically fixed on both surfaces of the electrolyte layer 11a. In other words, six anodes 11d are arranged on one plane of the electrolyte layer 11a at a predetermined distance, e.g., 1 mm, and six cathodes 11b are arranged on the other plane of the electrolyte layer 11a at a predetermined distance, e.g., 1 mm, thereby forming six single cells. The mesh-type current collectors 11e and 11c are positioned on the respective anode and cathodes 11d and 11b. As shown in FIG. 5, the mesh-type current collectors 11e and 11c are connected to the conductors 11f.

The conductors 11f electrically connect in series six unit cells each provided by a set of an anode 11d and a cathode 11b, thereby constituting an electrical circuit, which is generally known in the art and an explanation thereof will not be given herein.

In order to prevent an increase in resistance due to corrosion, the conductors 11f and the current collectors 11e and 11c are preferably formed of metal having good corrosion resistance, e.g., Ni or Pt. In this embodiment, Ni mesh coated with gold (Ag) and Cu foils are used as the current collectors and conductors, respectively. The current collectors 11e and 11c have a thickness of approximately 50 μm and a sufficiently high aperture ratio, thereby facilitating passage of methanol as liquid fuel.

Figure 6:
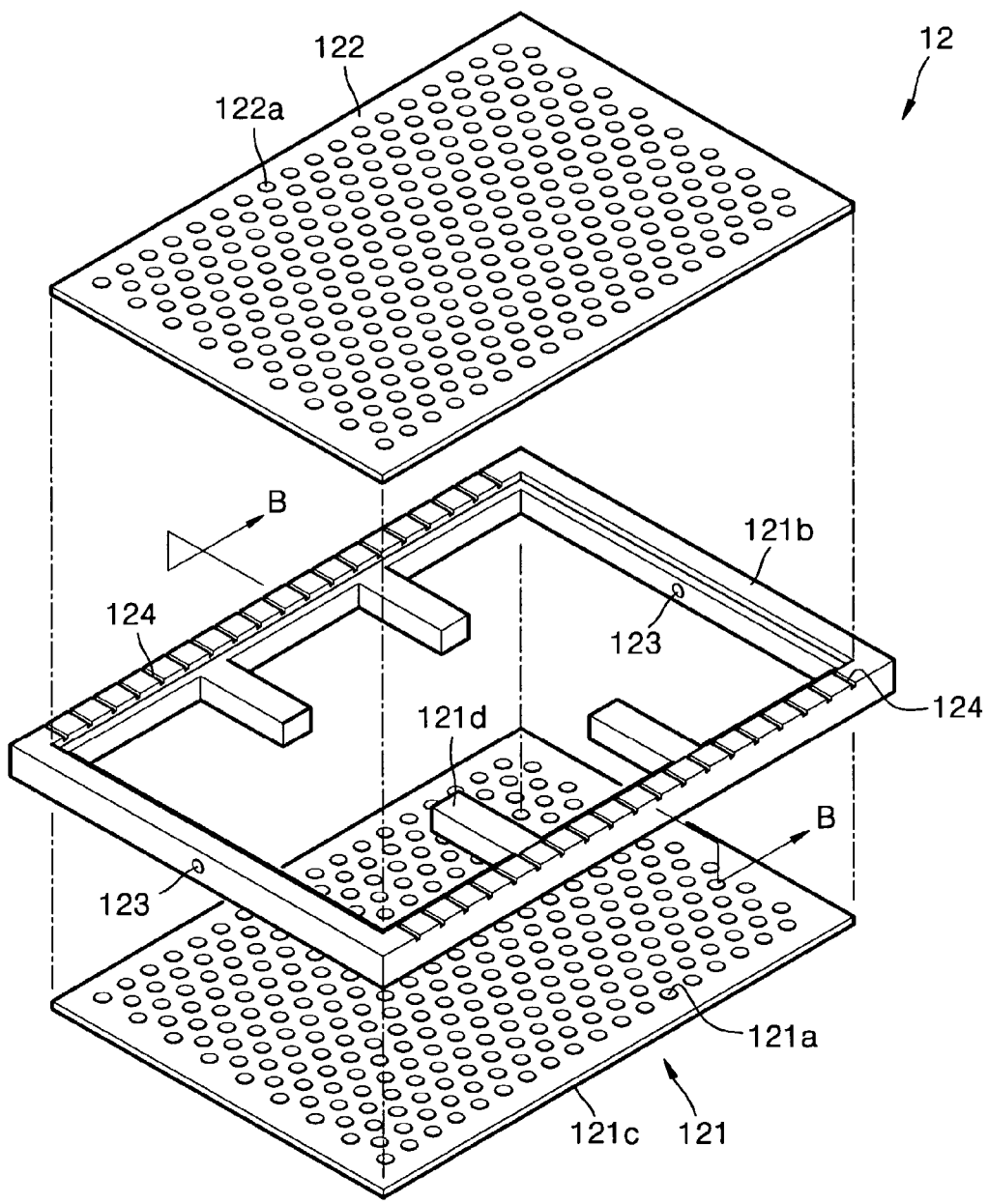
FIG. 6 is an exploded perspective view of a fuel supply unit employed in the air breathing direct methanol fuel cell pack shown in FIG. 1.
Figure 7:
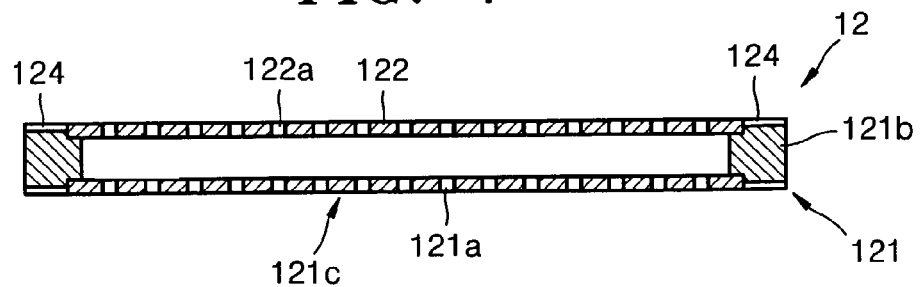
FIG. 7 is a schematic cross-sectional view illustrating the internal structure of a fuel supply unit shown in FIG. 6.

FIG. 6 is an exploded perspective view of the fuel supply unit 12, and FIG. 7 is a cross-sectional view of FIG. 6, taken along the line B—B. As shown in FIGS. 6 and 7, the fuel supply unit 12 includes a lower body 121 and an upper fuel supply plate 122 connected to the top portion of the lower body 121 and having a plurality of fuel supply holes 122a, the lower body 121 having a flange portion 121b of a predetermined height and a lower fuel supply plate 121c.

Methanol is stored in the fuel supply unit 12, and wicking sheets 31 and MEAs 11 are sequentially closely adhered to outer surfaces of the upper and lower fuel supply plates 122 and 121c. The upper and lower fuel supply plates 122 and 121c are members for supplying fuel using a capillary force. Thus, a small quanity of methanol in the fuel supply unit 12 is continuously supplied to the anodes 11d of the MEAs 11 through the fuel supply holes 122a and 121a of the upper and lower fuel supply plates 122 and 121c. The fuel supplied through the fuel supply plates 122 and 121c passes through the wicking sheets 31 before it reaches the anode 11d. That is to say, the fuel is diffused from the wicking sheets 31a to then be supplied to the anode 11d. In FIG. 6, reference mark 121d denotes reinforcement ribs serving as spacers for supporting the upper fuel supply plate 122 by tightening the central portion of the upper fuel supply plate 122.

Figure 8:
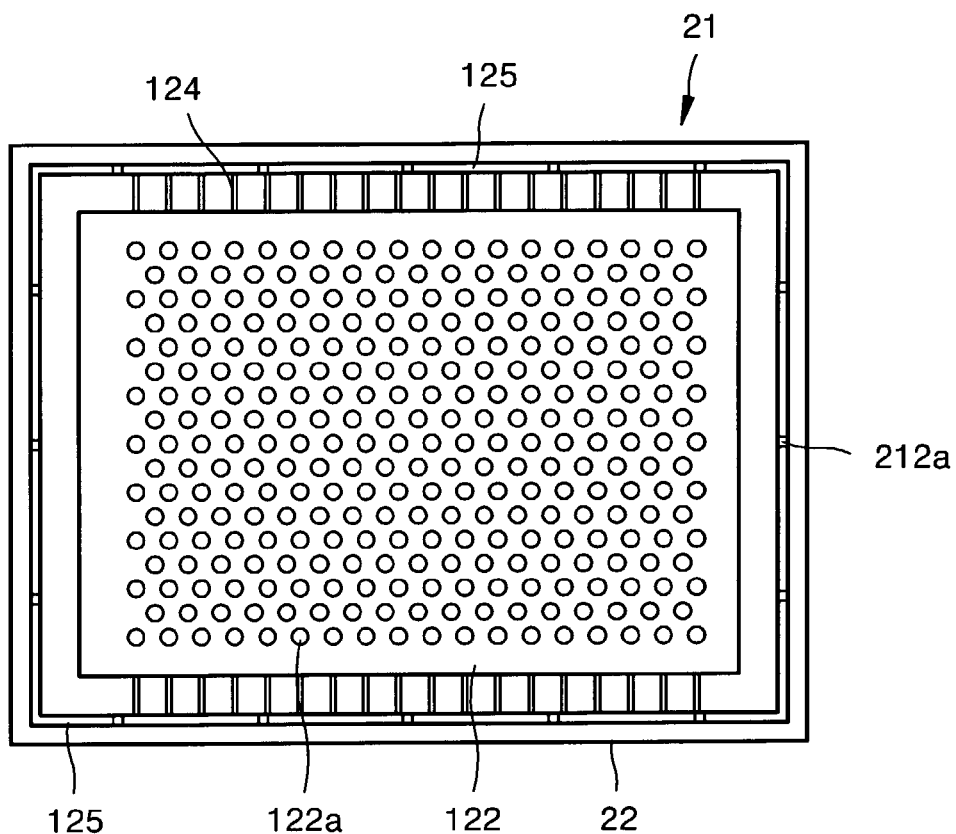
FIG. 8 is a schematic plan view illustrating the state in which a fuel supply unit is installed in a lower body of the air breathing direct methanol fuel cell pack according to the present invention.

A plurality of channels 124 for passage of carbon dioxide gas as a reaction byproduct are formed in parallel at top and bottom surfaces of the flange portion 121b. The channels 124 are formed for the purpose of exhausting the gas generated between the anode 11d and fuel supply plates 121c and 122 outside the flange portion 121b. FIG. 8 is a schematic plan view illustrating the state in which the fuel supply unit 12 is installed inside the lower body 21. As shown in FIG. 8, a gas communicating path 125 is provided between the fuel supply unit 12 and a wall body 212 and is supported by a spacer 212a. The gas communicating path 125 is connected to the gas exhaust holes 212b (FIG. 1). Thus, the reaction byproduct generated at the fuel supply plate 122 is exhausted to the gas communicating path 121 surrounding the fuel supply unit 12 via the plurality of channels 124 formed on the top surface of the flange portion 121b and then exhausted outside via the gas exhaust holes 212b.

Figure 9A:
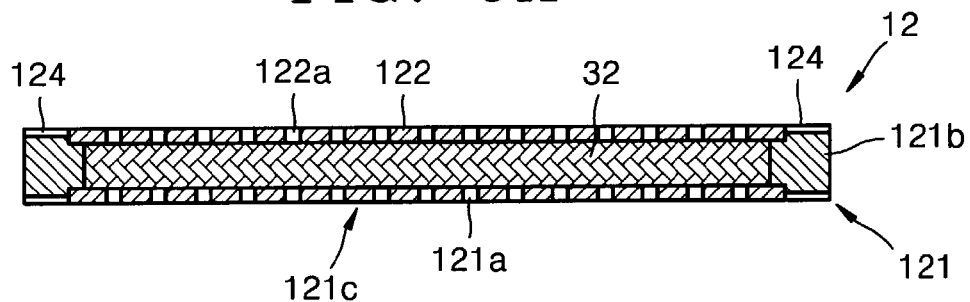
FIG. 9A is a schematic cross-sectional view of a fuel supply unit having a built-in wicking member in an air breathing direct methanol fuel cell pack according to another embodiment of the present invention.

As shown in FIG. 9A, a wicking member 32 capable of holding fuel, e.g., sponge, cotton or non-woven fabric, may be provided inside the fuel supply unit 12 so that the fuel can be evenly distributed even when the fuel supply unit 12 is leaned to one side. In the case where the fuel supply unit 12 is not fully filled with the fuel, if the use state or, posture of a cell pack is changed, the fuel is leaned inside the fuel supply unit 12 accordingly. To prevent the fuel from being leaned to one side, the fuel supply unit 12 is packed with the wicking member 32. Thus, even if only a small amount of the fuel remains in the fuel supply unit 12, the fuel is evenly distributed inside the fuel supply unit 12 by a capillary force.

Figure 9B:
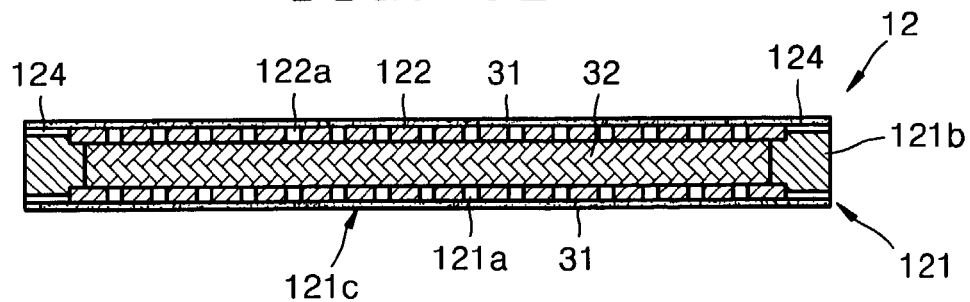
FIG. 9B is a schematic cross-sectional view illustrating the state in which wicking sheets are installed at the upper and lower portions of the fuel supply unit shown in FIG. 9A.

FIG. 9B shows a state in which the wicking sheets 31 are closely adhered to the top and bottom surfaces of the fuel supply unit 12 incorporating the wicking member 32. The wicking sheets 31 and the wicking member 32 can be formed of non-woven fabric such as polypropylene, and allows the fuel to be diffused very fast throughout the fuel supply unit 12 in a horizontal direction. According to this configuration, the fuel exists in the fuel supply unit 12 in an evenly distributed state, and the fuel exhausted via the fuel supply holes 121a and 122a are diffused again from the wicking sheets 31. Thus, since the fuel is evenly distributed throughout the wicking sheets 31, the fuel can be uniformly supplied to anodes contacting the wicking sheets 31.

Figure 10:
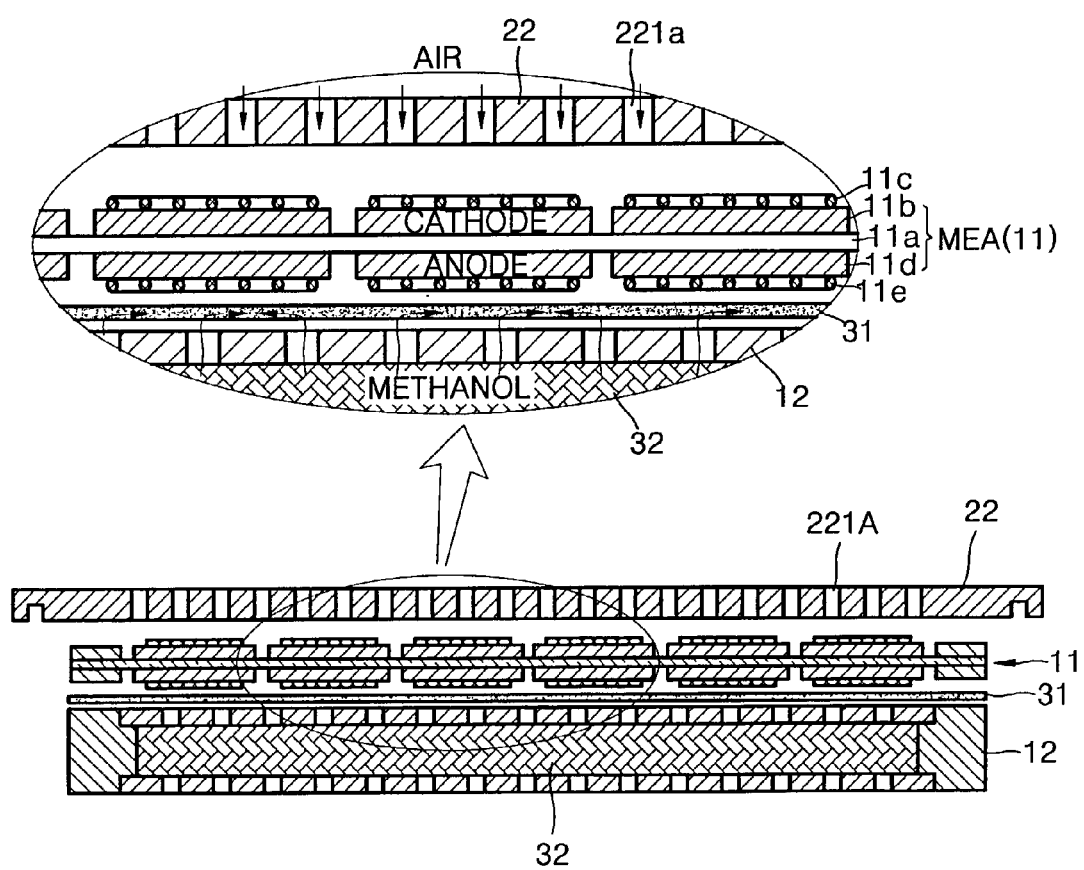
FIG. 10 is a cross-sectional development diagram of liquid fuel and air supply units of the air breathing direct methanol fuel cell pack according to the present invention.

FIG. 10 is a partially exploded cross-sectional development diagram illustrating the stacked structure of the wicking sheets 31, the MEAs 11 and the upper panel member 22 over the fuel supply unit 12 packed with the wicking member 32. As shown in FIG. 10, air is induced through air vent holes 221a of the upper panel member 22 to then be transferred to the cathode 11b, while the fuel diffused by the wicking sheets 31 is supplied to the anode 11d. The fuel supply unit 12 also includes the wicking member 32 in which the fuel is diffused and distributed by a capillary phenomenon. The wicking member 32 evenly diffuses the fuel even when the fuel supply unit 12 contains an insufficient amount of fuel, so that the fuel is evenly supplied through all fuel supply holes of fuel supply plates. In supplying air and fuel in such a manner, the current collectors 11c and 11e are formed of a mesh type metal capable of passing through air and fuel. Thus, the current collectors 11c and 11e allow air and fuel to pass through the same and also serve as current collectors.

In the above-described embodiment, MEAs are symmetrically provided at both sides of a single fuel supply unit. However, according to another embodiment of the present invention, the structure in which MEAs are symmetrically provided at both sides of a single fuel supply unit, may be modified such that an MEA is provided only at an upper or lower panel member having air vent holes.

Figure 11:
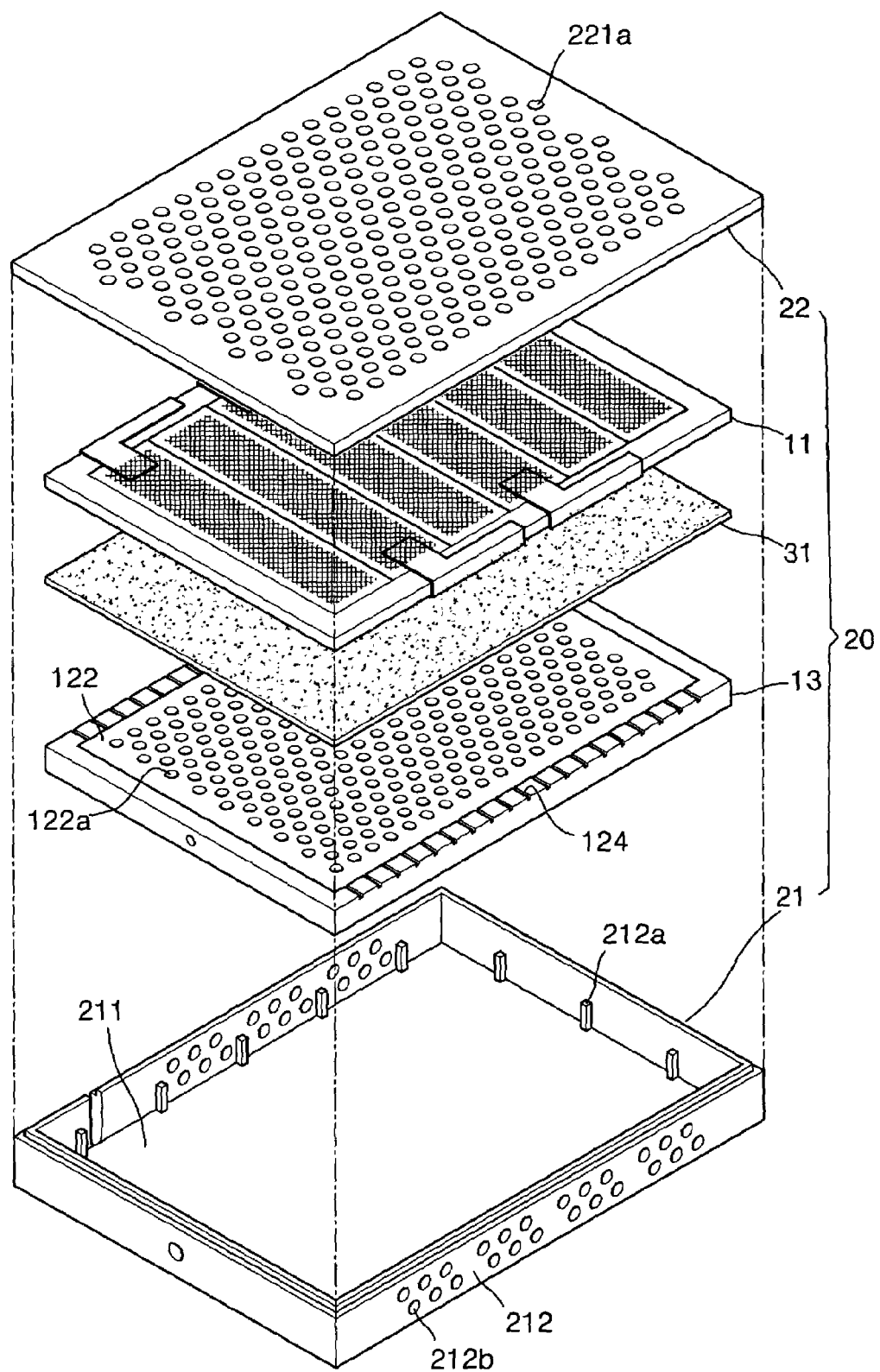
FIG. 11 is an exploded perspective view schematically illustrating an air breathing direct methanol fuel cell pack according to a still another embodiment of the present invention.

FIG. 11 shows an air breathing direct methanol fuel cell pack according to a second embodiment of the present invention, in which air vent holes are formed only at an upper panel member side. As shown in FIG. 11, a fuel supply unit 13 is disposed on the bottom of a box-shaped lower body 21 having a wall body 212 on the perimeter thereof, and a wicking sheet 31 and an MEA 11 are sequentially positioned thereon. An upper panel member 22 is coupled to the lower body 21 in a state in which the MEA 11 is pressed by the upper panel member 22. Anodes and cathodes, and current collector plates corresponding to the respective electrodes, are provided in the MEA 11, although not shown in FIG. 11. In the cell pack shown in FIG. 11, the upper panel member 22 has a plurality of air vent holes 221a whereas no air vent hole is provided in a lower panel member 211. However, air vent holes may also be provided in the lower panel member 211, which promotes exhaustion of byproducts. A fuel supply plate 122 with fuel supply holes 122a provided on the plane facing the MEA 11 is provided in the fuel supply unit 12, and the opposite plane facing the lower panel member 211 is closed.

Figure 12:
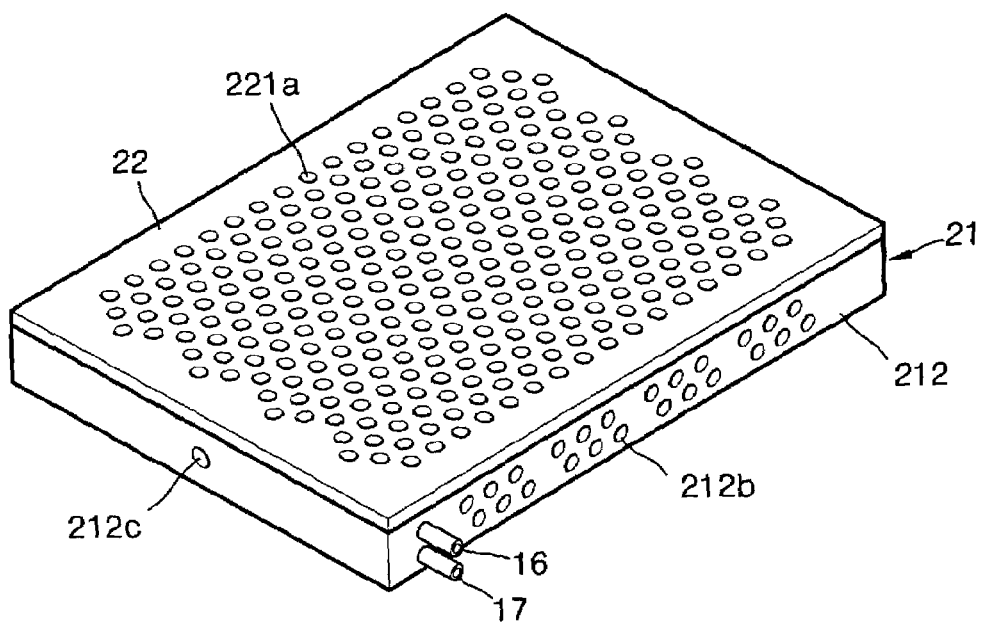
FIG. 12 is a cross-sectional view schematically illustrating the assembled state of the air breathing direct methanol fuel cell pack shown in FIG. 1.

FIG. 12 is a perspective view schematically illustrating the assembled state of the air breathing direct methanol fuel cell pack shown in FIG. 1. The assembled cell pack has a dimension of 6.0×8.0×1.0 (breadth/length/thickness) in centimeters. Air vent holes 221a and 211a for supplying external air are arranged at upper and lower panel members at constant intervals. Gas exhaust holes 212b for exhausting carbon dioxide gas which is one of reaction byproducts are formed on the internal surface of a wall body 212. Terminals 16 and 17 serially connected with 12 unit cells provided at two MEAs symmetrically disposed inside each cell pack are installed at one lateral surface of each cell pack.

A. Fabrication of Electrodes

An anode was fabricated by squeeze-coating a slurry prepared by mixing carbon black, isopropyl alcohol (IPA) and polytetrafluoroethylene (PTFE) onto porous carbon paper to form a fuel diffusion layer, the carbon paper not being treated with water-repellent process for promoting smooth supply of liquid fuel, and then drying the fuel diffusion layer at an oven maintained at a temperature of approximately 120° C. for 2 hours. To impart a viscosity suitable for squeeze-coating to the slurry, the content of PTFE was adjusted to approximately 10%. A catalyst layer was fabricated by squeeze-coating a slurry prepared by mixing PtRu black (produced by Johnson Matthey Co.) as a catalyst, water, IPA and 5% Nafion solution (produced by Aldrich Chemical Co.) onto the fuel diffusion layer using an ultrasonic mixer for 2 hours. The Nafion solution was used in an amount of 15% by weight based on the weight of PtRu black. The catalyst was loaded into an electrode in an amount of 11 mg/cm$^2$. The fabricated electrode was dried at a vacuum oven maintained at a temperature of approximately 80° C. for approximately one hour to remove IPA from the electrode.

A cathode was fabricated by squeeze-coating a slurry prepared by mixing carbon black, IPA and PTFE onto porous carbon paper to form a fuel diffusion layer, the carbon paper being treated with water-repellent process for promoting smooth supply of oxygen and effective exhaustion of water and carbon dioxide, and then drying the fuel diffusion layer at an oven maintained at a temperature of approximately 120° C. for 2 hours. To impart a viscosity suitable for squeeze-coating to the slurry, the content of PTFE was adjusted to approximately 10%. A catalyst layer was fabricated by squeeze-coating a slurry prepared by mixing Pt black (produced by Johnson Matthey Co.) as a catalyst, water, IPA and 5% Nafion solution (produced by Aldrich Chemical Co.) onto the fuel diffusion layer using an ultrasonic mixer for 2 hours. The Nafion solution was used in an amount of 15% by weight based on the weight of Pt black. The catalyst loading was about 10 mg/cm$^2$. The resultant structure was dried at a vacuum oven maintained at a temperature of approximately 80° C. for approximately one hour to remove IPA from the electrode.

B. Fabrication of MEA for Cell Pack

A 127 μm thick Nafion 115 membrane (produced by DuPont Co.) was used as an electrolyte membrane. For removing impurities, the membrane was pretreated with $H_2SO_4$ and $H_2O_2$, followed by drying at a gel-dryer. The anode and the cathode were cut into a size of 4.5 cm$^2$, and each 6 sheets of electrodes were arranged on both surfaces of the electrolyte membrane and hot-pressed at 125° C. under a pressure of 9 metric tons for 5 minutes, thereby fabricating a 6-cell MEA.

C. Fabrication of Cell Pack

In the fabricated 6-cell MEA, the respective cells were connected to each other in series by current collectors formed of nickel mesh having a size equal to or slightly smaller than an electrode (slightly smaller in the above-described embodiments). The nickel mesh was plated with gold for the purpose of preventing corrosion due to methanol. The respective nickel meshes were connected to each other by ultrasonic welding machine using a conductor made of a copper foil.

The cell pack is constituted by an upper panel member, a lower panel member and a fuel supply (or storage) unit and 6-cell MEAs connected by current collectors in series are symmetrically arranged at both sides of the fuel supply unit.

Methanol fuel is supplied to an anode by a capillary force and external atmospheric oxygen is supplied to a cathode through air vent holes formed at the upper and lower panel members of the cell pack. The cell pack according to the present invention operates in an air breathing type at room temperature and atmospheric pressure.

Figure 13:
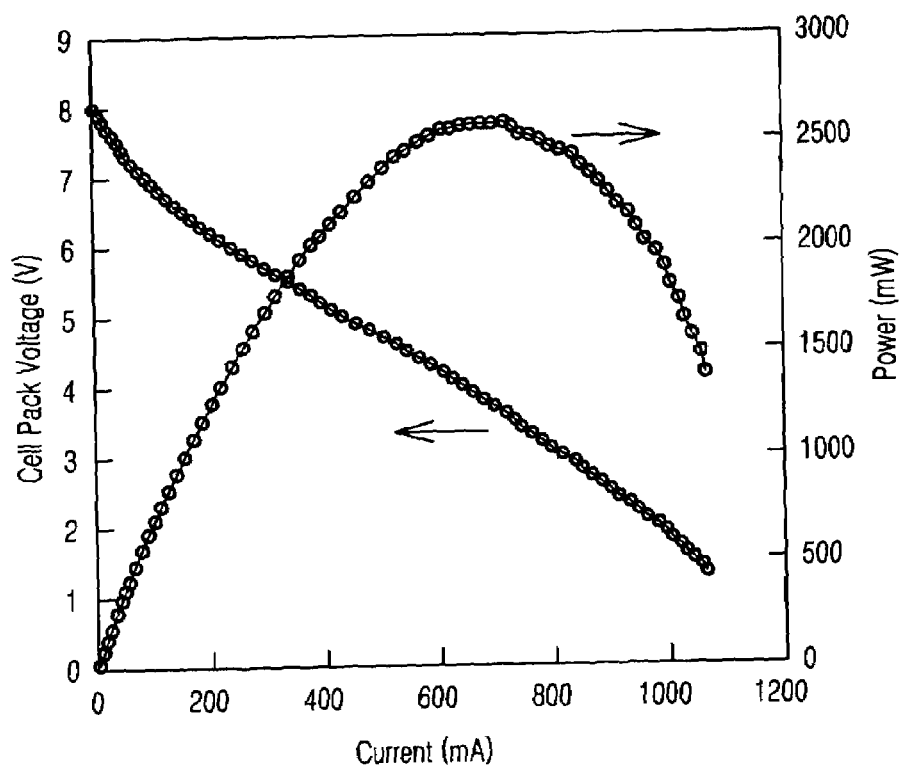
FIG. 13 is a graphical representation illustrating the performance of a cell pack according to the present invention.

FIG. 13 is a graphical representation illustrating the performance curve of a cell pack according to the present invention. The cell pack is configured such that 12 sheets of electrodes each having an area of 4.5 cm$^2$ are connected to each other in series. After 5 M methanol was injected into a fuel inlet port of the cell pack, the cell pack was tested under room temperature, air breathing conditions. The cell pack showed the performance of 717 mA (159 mA/cm$^2$) at 3.6 V, and exhibited the maximum power of 2607 mW (48 mW/cm$^2$) at 3.64 V.

According to the present invention, fuel can be evenly supplied throughout MEAs, thereby attaining uniform power output, irrespective of a use posture of a cell pack. Also, current collectors of the present invention is of a mesh type so that current collection from all electrodes is allowed while allowing fuel supply. Further, since a gas communicating path for passage of byproducts is provided around the fuel supply unit and gas exhaust holes are provided on a wall body contacting the gas communicating path, byproducts can be effectively exhausted.

What is claimed is:

1. An air breathing direct methanol fuel cell pack comprising:
    two membrane electrode assemblies (MEAs) forming a plurality of single cells having an electrolyte membrane, a plurality of anodes on a first plane of the electrolyte membrane and a plurality of cathodes on a second plane of the electrolyte membrane correspondingly to the anodes, the second plane being opposed to the first plane;
    a fuel supply unit storing fuel having two fuel supply plates with a plurality of fuel supply holes through which the fuel passes, wherein the fuel supply plates are provided at both sides of the fuel supply unit facing the respective MEAs, and the fuel supply unit is disposed between the MEAs; and
    wicking sheets interposed between each of the MEAs and the fuel supply plates, diffusing the fuel supplied through the fuel supply plates to supply the fuel to the anodes of the MEAs.

2. The air breathing direct methanol fuel cell pack according to claim 1, further comprising a wicking member for diffusing fuel into the fuel supply unit by a capillary force.

3. The air breathing direct methanol fuel cell pack according to claim 2, wherein current collectors installed on the cathodes and the anodes are formed of a metal mesh to allow passage of air and liquid fuel.

4. The air breathing direct methanol fuel cell pack according to claim 2, wherein the fuel supply unit, the MEAs and the wicking sheets disposed therebetween are provided between upper and lower panel members, and a wall body is formed between the upper and lower panel members along the perimeter, thus forming a housing in cooperation with the upper and lower panel members.

5. The air breathing direct methanol fuel cell pack according to claim 1, wherein the fuel supply unit, the MEAs and the wicking sheets disposed therebetween are provided between upper and lower panel members, and a wall body is formed between the upper and lower panel members along the perimeter, thus forming a housing in cooperation with the upper and lower panel members.

6. The air breathing direct methanol fuel cell pack according to claim 5, wherein a gas communicating path is provided between the fuel supply unit and the wall body and a plurality of channels for passage of reaction byproducts generated between the fuel supply plates and MEAs are formed in the fuel supply unit.

7. The air breathing direct methanol fuel cell pack according to claim 1, wherein the upper and lower panel members with a plurality of air vent holes are provided at the external sides of the MEAs to face the cathodes, and a wall body is formed between the upper and lower panel members along the perimeter, thus forming a housing in cooperation with the upper and lower panel members.

8. The air breathing direct methanol fuel cell pack according to claim 7, wherein a gas communicating path is provided between the fuel supply unit and the wall body and a plurality of channels for passage of reaction byproducts generated between the fuel supply plates and MEAs are formed in the fuel supply unit.

9. The air breathing direct methanol fuel cell pack according to claim 1, wherein the fuel supply holes allow for direct passage of fuel and/or air between adjacent portions of the fuel supply unit and the wicking sheets.

10. The air breathing direct methanol fuel cell pack according to claim 9, further comprising at least one wicking member within the fuel supply unit, wherein the wicking member passes fuel directly to the wicking sheets through exhaustion in the fuel supply holes to evenly, distribute the fuel throughout the wicking sheets.

11. The air breathing direct methanol fuel cell pack according to claim 1, further comprising a metal mesh current collector between the wicking sheets and the MEAs.

12. An air breathing direct methanol fuel cell pack comprising:
    two membrane electrode assemblies (MEAs) forming a plurality of single cells having an electrolyte membrane, a plurality of anodes on a first plane of the electrolyte membrane and a plurality of cathodes on a second plane of the electrolyte membrane correspondingly to the anodes, the second plane being opposed to the first plane;
    a fuel supply unit storing fuel having two fuel supply plates with a plurality of fuel supply holes through which the fuel passes, wherein the fuel supply plates are provided at both sides of the fuel supply unit facing the respective MEAs, and the fuel supply unit is disposed between the MEAs; and
    wicking sheets interposed between each of the MEAs and the fuel supply plates, diffusing the fuel supplied through the fuel supply plates to supply the fuel to the anodes of the MEAs, wherein current collectors installed on the cathodes and the anodes are formed of a metal mesh to allow passage of air and liquid fuel.

13. The air breathing direct methanol fuel cell pack according to claim 12, wherein the current collectors are air and fuel permeable conductive members.

14. An air breathing direct methanol fuel cell pack comprising:
   at least two membrane electrode assemblies (MEAs) forming a plurality of single cells having an electrolyte membrane, a plurality of anodes on a first plane of the electrolyte membrane and a plurality of cathodes on a second plane of the electrolyte membrane correspondingly to the anodes, the second plane being opposed to the first plane;
   a fuel supply unit storing fuel fed to the anodes and having fuel supply plates with a plurality of fuel supply holes through which the fuel passes, wherein the fuel supply unit is disposed between MEAs;
   wicking sheets provided along a fuel supply path between the fuel supply plates and the MEAs, diffusing the fuel supplied through the fuel supply plates to supply the fuel to the anodes of the MEAs; and
   a wicking member for diffusing fuel into the fuel supply unit by a capillary force, wherein current collectors installed on the cathodes and the anodes are formed of a metal mesh to allow passage of air and liquid fuel.

15. The air breathing direct methanol fuel cell pack according to claim 14,
   wherein the current collectors comprise:
      a first mesh current collector on the first plane of the electrolyte membrane; and
      a second mesh current collector on the second plane of the electrolyte membrane, and
   wherein the wicking sheets comprise:
      a first wicking sheet between the fuel supply plates and a first MEA; and
      a second wicking sheet between the fuel supply plates and a second MEA.

16. The air breathing direct methanol fuel cell pack according to claim 15, wherein the first mesh current collector is in contact with a majority of the surfaces on the side of the anode opposite from the electrolyte membrane; and wherein the second mesh current collector is in contact with a majority of the surfaces on the side of cathode opposite from the electrolyte membrane.

17. The air breathing direct methanol fuel cell pack according to claim 15, further comprising:
   a first conductor located on the anode; and
   a second conductor located on the cathode,
   wherein the first mesh current collector at least partially covers the first conductor and the anode, and
   wherein the second mesh current collector at least partially covers the second conductor and the cathode.

18. The air breathing direct methanol fuel cell pack according to claim 15, wherein the first and second mesh current collectors comprise elongated rectangular mesh strips.

19. The air breathing direct methanol fuel cell pack according to claim 15, wherein the first mesh current collector and/or the second mesh current collector comprises a corrosion resistant metal mesh coated with a conductive metal.

20. The air breathing direct methanol fuel cell pack according to claim 19, wherein the corrosion resistant metal mesh comprises Ni or Pt, and/or wherein the conductive metal comprises Ag and/or Cu foils.

21. The air breathing direct methanol fuel cell pack according to claim 15, wherein the first wicking sheet and/or the second wicking sheet comprise air and fuel permeable non-woven fabric materials that diffuse air and fuel therethrough.

22. The air breathing direct methanol fuel cell pack according to claim 15, wherein the fuel supply unit comprises a hexahedral fuel supply unit with:
   an upper fuel supply plate;
   a lower body opposite the upper fuel supply plate;
   a fuel inlet port;
   a plurality of fuel supply holes in the upper fuel supply plate and the lower body; and
   a wicking member between the upper fuel supply plate and the lower body.

* * * * *